(12) United States Patent
Seo et al.

(10) Patent No.: US 10,349,435 B2
(45) Date of Patent: Jul. 9, 2019

(54) METHOD FOR BASE STATION TRANSMITTING DOWNLINK CONTROL CHANNEL IN WIRELESS COMMUNICATION SYSTEM AND APPARATUS FOR SAME

(71) Applicant: LG ELECTRONICS INC., Seoul (KR)

(72) Inventors: Hanbyul Seo, Anyang-si (KR); Byounghoon Kim, Anyang-si (KR); Kijun Kim, Anyang-si (KR); Hakseong Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/813,716

(22) Filed: Nov. 15, 2017

(65) Prior Publication Data

US 2018/0084571 A1 Mar. 22, 2018

Related U.S. Application Data

(63) Continuation of application No. 15/615,536, filed on Jun. 6, 2017, now Pat. No. 9,877,339, which is a
(Continued)

(51) Int. Cl.
*H04W 72/04* (2009.01)
*H04W 72/12* (2009.01)
(Continued)

(52) U.S. Cl.
CPC ....... *H04W 72/1273* (2013.01); *H04L 5/0053* (2013.01); *H04L 5/0064* (2013.01);
(Continued)

(58) Field of Classification Search
CPC ..... H04L 5/001; H04L 5/0053; H04L 5/0094; H04L 5/0007; H04L 2025/03426;
(Continued)

(56) References Cited

U.S. PATENT DOCUMENTS

2009/0161545 A1 6/2009 Ho et al.
2010/0054147 A1 3/2010 Ishii
(Continued)

FOREIGN PATENT DOCUMENTS

CN 102113243 6/2011
JP 2013-506376 2/2013
(Continued)

OTHER PUBLICATIONS

Nortel Networks, "Control Channel Design for the Support of Wider Bandwidth for LTE-Advanced", R1-090157, TSG-RAN1 #55bis, Jan. 2009, 10 pages.
(Continued)

*Primary Examiner* — Sai Aung
(74) *Attorney, Agent, or Firm* — Lee Hong Degerman Kang Waimey

(57) ABSTRACT

In the present invention, a method for a base station transmitting a downlink channel is disclosed. More particularly, the method comprises the steps of: dividing each of one or more resources blocks, which are allocated for the downlink control channel, into a predetermined number of subsets; deciding the number of subsets that comprise a resource allocation basic unit for the downlink control channel, based on a start symbol and/or an end symbol of the downlink control channel; mapping a transmission resource on the downlink control channel as the resource allocation basic unit comprising the predetermined number of subsets; and transmitting the downlink control channel by using the transmission resource that is mapped.

8 Claims, 12 Drawing Sheets

Related U.S. Application Data continuation of application No. 15/072,787, filed on Mar. 17, 2016, now Pat. No. 9,736,856, which is a continuation of application No. 14/236,840, filed as application No. PCT/KR2012/004905 on Jun. 21, 2012, now Pat. No. 9,325,474.

(60) Provisional application No. 61/525,199, filed on Aug. 19, 2011, provisional application No. 61/549,251, filed on Oct. 20, 2011, provisional application No. 61/552,438, filed on Oct. 27, 2011.

(51) Int. Cl.
| *H04L 5/00* | (2006.01) |
|---|---|
| *H04W 88/02* | (2009.01) |
| *H04W 88/08* | (2009.01) |
| *H04W 88/16* | (2009.01) |

(52) U.S. Cl.
CPC ....... *H04W 72/0453* (2013.01); *H04L 5/0007* (2013.01); *H04W 88/02* (2013.01); *H04W 88/08* (2013.01); *H04W 88/16* (2013.01)

(58) Field of Classification Search
CPC ........... H04L 25/0202; H04L 25/03343; H04L 27/2647; H04W 72/042; H04W 72/0406; H04W 72/04; H04W 72/0446; H04W 28/12; H04W 72/046
See application file for complete search history.

(56) References Cited

U.S. PATENT DOCUMENTS

| | | | |
|---|---|---|---|
| 2010/0080135 A1 | 4/2010 | Ishii et al. | |
| 2010/0173637 A1 | 7/2010 | Damnjanovic et al. | |
| 2011/0249633 A1* | 10/2011 | Hong | H04L 5/0053 370/329 |
| 2011/0269492 A1* | 11/2011 | Wang | H04L 5/003 455/509 |
| 2012/0236813 A1 | 9/2012 | Tan | |
| 2013/0028354 A1* | 1/2013 | Lindoff | H04B 7/0845 375/340 |
| 2013/0058286 A1* | 3/2013 | Takeda | H04W 72/042 370/329 |
| 2013/0121295 A1* | 5/2013 | Saito | H04L 5/001 370/329 |
| 2013/0163525 A1 | 6/2013 | Moon et al. | |
| 2013/0223402 A1* | 8/2013 | Feng | H04L 5/0007 370/330 |
| 2013/0272259 A1 | 10/2013 | Kim et al. | |
| 2014/0161082 A1* | 6/2014 | Gao | H04W 72/1263 370/329 |
| 2014/0161092 A1 | 6/2014 | Seo et al. | |
| 2016/0198490 A1 | 7/2016 | Seo et al. | |
| 2017/0273102 A1 | 9/2017 | Seo et al. | |

FOREIGN PATENT DOCUMENTS

| | | |
|---|---|---|
| KR | 1020080086317 | 9/2008 |
| KR | 1020110020732 | 3/2011 |
| WO | 2010053984 | 5/2010 |
| WO | 2011/024277 | 3/2011 |
| WO | 2011/035675 | 3/2011 |
| WO | 2011085195 | 7/2011 |
| WO | 2011093671 | 8/2011 |

OTHER PUBLICATIONS

PCT International Application No. PCT/KR2012/004905, Written Opinion of the International Searching Authority dated Dec. 17, 2012, 11 pages.
PCT International Application No. PCT/KR2012/004905, Written Opinion of the International Searching Authority dated Dec. 17, 2012, 16 pages.
ETRI, "Discussions on enhanced PDCCH structure," 3GPP TSG RAN WG1 Meeting #66, R1-112211, Aug. 2011, 4 pages.
Ericsson, et al., "On Downlink control signalling enhancements," 3GPP TSG-RAN WG1 #66, Tdoc R1-112292, Aug. 2011, 2 pages.
Samsung, "Discussion on ePDCCH Design Issues," 3GPP TSG-RAN1 #66 meeting, R1-112517, Aug. 2011, 4 pages.
European Patent Office Application Serial No. 12826001.5 Search Report dated Apr. 29, 2015, 7 pages.
The State Intellectual Property Office of the People's Republic of China Application Serial No. 201280040411.2, Office Action dated Feb. 24, 2016, 13 pages.
Samsung, "R-PDCCH REG/CCE mapping onto PRBs", R1-105403, 3GPP TSG RAN WG1 #62bis, Oct. 2010, 4 pages.
ETRI, "Discussions on enhanced PDCCH structure", R1-112211, 3GPP TSG RAN WG1 Meeting #66, Aug. 2011, 3 pages.
Samsung, "R-PDCCH design," 3GPP TSG RAN WG1 Meeting #60bis, R1-102218, Apr. 2010, 4 pages.
Panasonic, "Summary of Open Backhaul Control Issues," 3GPP TSG-RAN WG1 Meeting 58bis, R1-093950, Oct. 2009, 5 pages.
NEC Group, "Search Space Design and RE mapping for the Non-interleaved R-PDCCH (Mode 2)," TSG-RAN WG1 #63, R1-106223, Nov. 2010, 7 pages.
NEC Group, "R-PDCCH blind decoding for Frequency Diversity and Frequency Selective R-PDCCH transmissions", 3GPP TSG RAN WG1 Meeting #61bis, R1-103834, Jul. 2010, 6 pages.
LG Electronics, "R-PDCCH RE mapping", 3GPP TSG RAN WG1 Meeting #62bis, R1-105349, Oct. 2010, 3 pages.

\* cited by examiner

FIG. 2
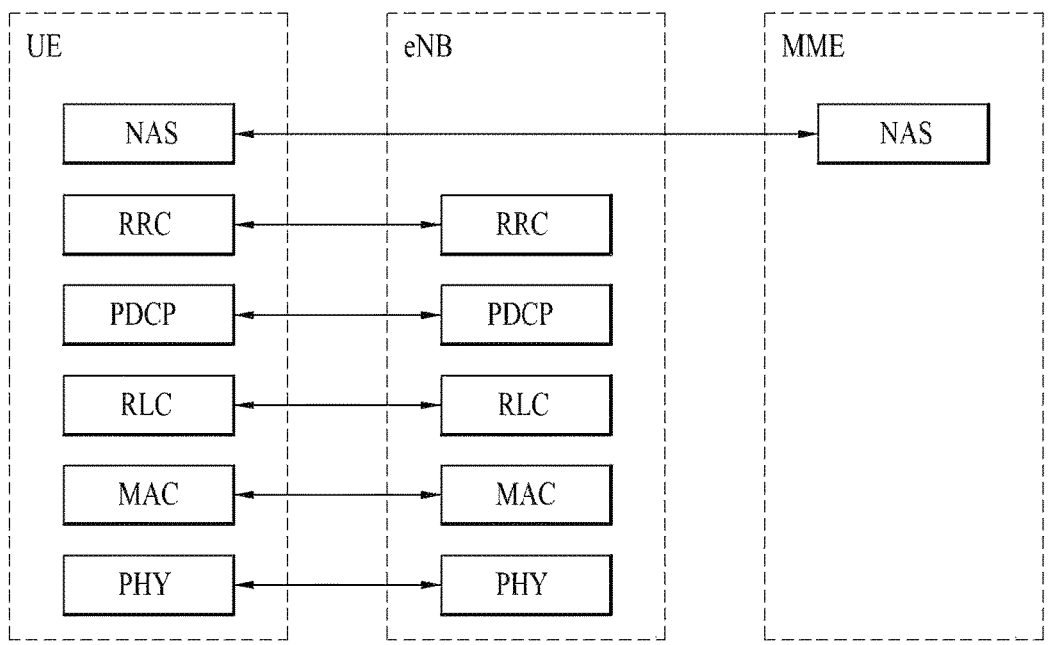
(a) Control-Plane Protocol Stack
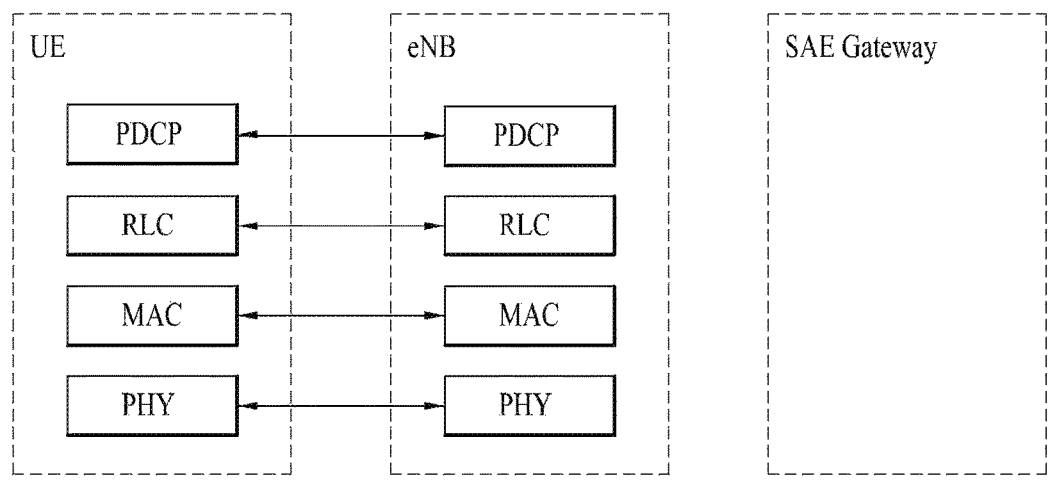
(b) User-Plane Protocol Stack

FIG. 6
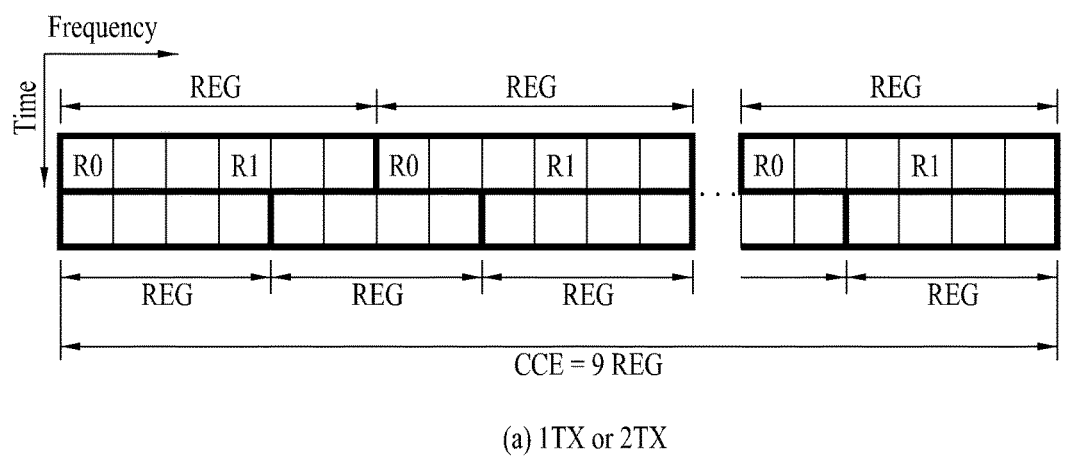
(a) 1TX or 2TX
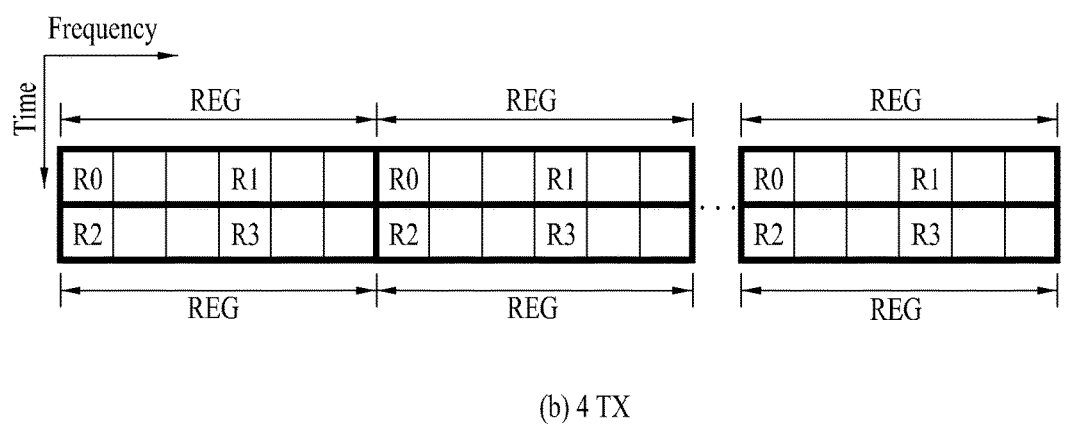
(b) 4 TX

FIG. 11
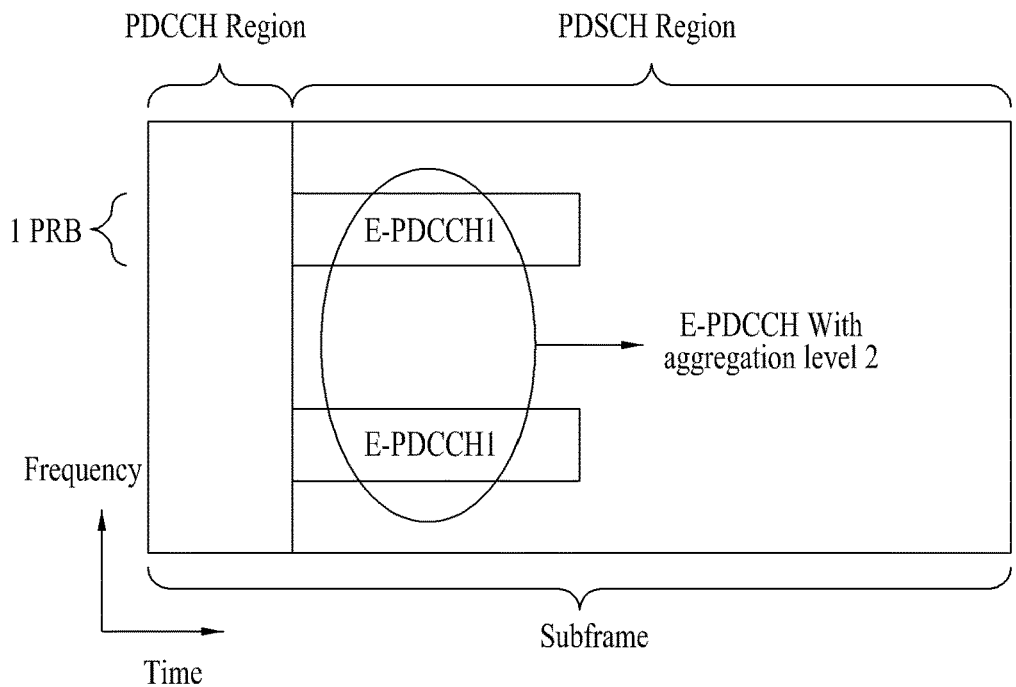
(a)
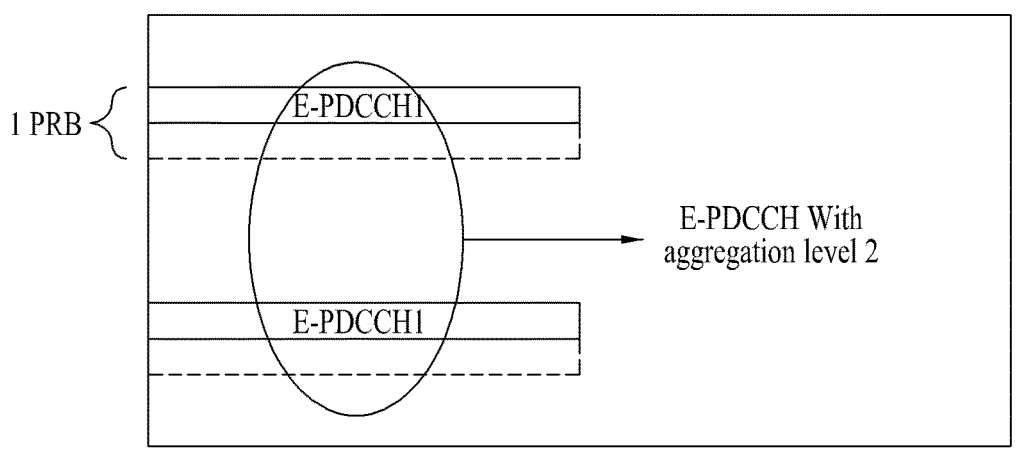
(b)

METHOD FOR BASE STATION TRANSMITTING DOWNLINK CONTROL CHANNEL IN WIRELESS COMMUNICATION SYSTEM AND APPARATUS FOR SAME

CROSS-REFERENCE TO RELATED APPLICATIONS

This application is a continuation of U.S. patent application Ser. No. 15/615,536, filed on Jun. 6, 2017, now U.S. Pat. No. 9,877,339, which is a continuation of U.S. patent application Ser. No. 15/072,787, filed on Mar. 17, 2016, now U.S. Pat. No. 9,736,856, which is a continuation of U.S. patent application Ser. No. 14/236,840, filed on Feb. 3, 2014, now U.S. Pat. No. 9,325,474, which is the National Stage filing under 35 U.S.C. 371 of International Application No. PCT/KR2012/004905, filed on Jun. 21, 2012, which claims the benefit of U.S. Provisional Application Nos. 61/525,199, filed on Aug. 19, 2011, 61/549,251, filed on Oct. 20, 2011, and 61/552,438, filed on Oct. 27, 2011, the contents of which are all hereby incorporated by reference herein in their entirety.

TECHNICAL FIELD

The present invention relates to a wireless communication system, and more particularly, to a method and apparatus for transmitting a downlink control channel at a base station in a wireless communication system.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.44, 3, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE

Technical Problem

An object of the present invention devised to solve the problem lies on a method and apparatus for transmitting a downlink control channel at a base station in a wireless communication system.

Technical Solution

In an aspect of the present invention, a method for transmitting a downlink control channel at a base station in a wireless communication system includes dividing each of one or more resource blocks allocated to the downlink control channel into a predetermined number of subsets, determining a number of subsets that form a basic resource allocation unit for the downlink control channel, based on at least one of starting and ending symbols of the downlink control channel, mapping transmission resources to the downlink control channel, using a basic resource allocating unit configured with the determined number of subsets, and transmitting the downlink control channel in the mapped transmission resources.

The transmission resources may be an aggregate of one or more basic resource allocation units. In addition, the transmission resources may be located in a data region of a subframe.

If the index of the starting symbol of the downlink control channel is smaller than a first value, the number of subsets may be determined to be a value equal to or larger than 1 and smaller than the predetermined number. If the index of the starting symbol of the downlink control channel is equal to or larger than a first value, the number of subsets may be determined to be the predetermined number.

If the index of the ending symbol of the downlink control channel is equal to or larger than a second value, the number of subsets may be determined to be a value equal to or larger than 1 and smaller than the predetermined number. If the index of the ending symbol of the downlink control channel is smaller than a second value, the number of subsets may be determined to be the predetermined number.

In another aspect of the present invention, a method for receiving a downlink control channel at a user equipment in a wireless communication system includes configuring a basic resource allocation unit for the downlink control channel, using one or more resource blocks allocated to the downlink control channel, and receiving the downlink control channel by monitoring a search space on the basic resource allocation unit basis according to an aggregation level. Each of the one or more resource blocks is divided into a predetermined number of subsets and a number of subsets that form the basic resource allocation unit is determined based on at least one of starting and ending symbols of the downlink control channel.

Resources in which the downlink control channel is received may be an aggregate of one or more basic resource allocation units. The resources in which the downlink control channel may be located in a data region of a subframe.

If the index of the starting symbol of the downlink control channel is smaller than a first value, the number of subsets may be equal to or larger than 1 and smaller than the predetermined number. If the index of the starting symbol of the downlink control channel is equal to or larger than a first value, the number of subsets may be the predetermined number.

If the index of the ending symbol of the downlink control channel is equal to or larger than a second value, the number of subsets may be equal to or larger than 1 and smaller than the predetermined number. If the index of the ending symbol of the downlink control channel is smaller than a second value, the number of subsets may be the predetermined number.

Advantageous Effects

According to embodiments of the present invention, a base station can efficiently transmit a downlink control channel in a wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN);

FIG. 6 illustrates resources units used for configuring a downlink control channel in the LTE system;

FIG. 11 illustrates an example of defining a basic aggregation unit for an E-PDCCH according to another embodiment of the present invention.

BEST MODE

Figure 1:
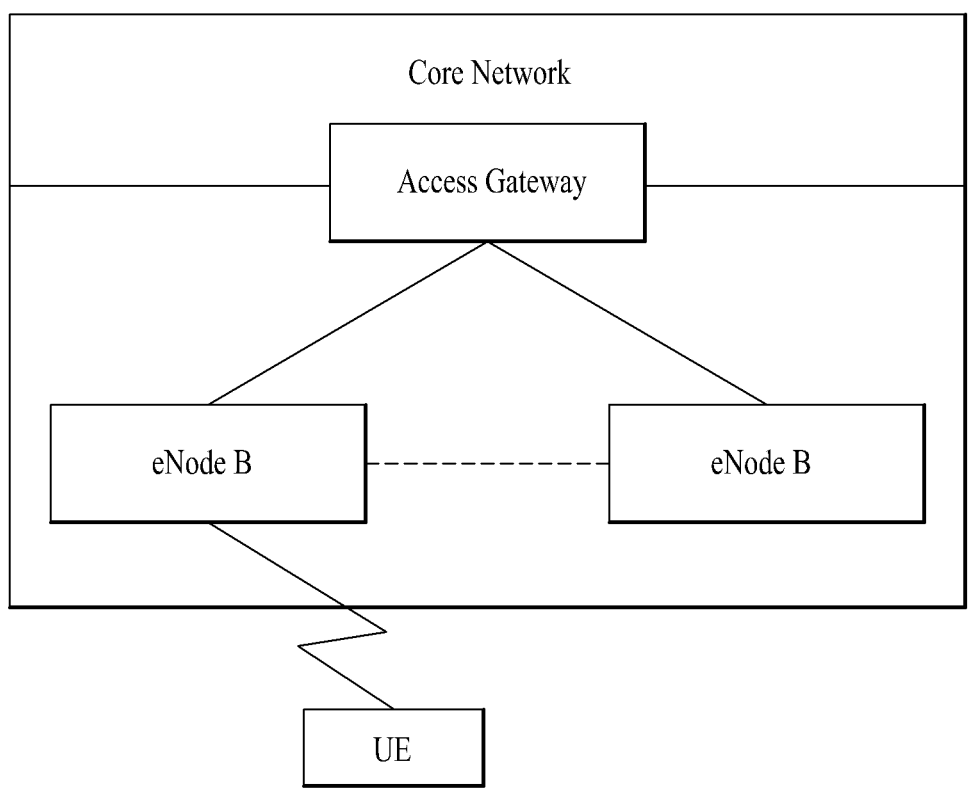
FIG. 1 illustrates a configuration of an Evolved Universal Mobile Telecommunications System (E-UMTS) network as an example of a wireless communication system.

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

A cell managed by an evolved Node B (eNB or eNode B) is set to one of bandwidths of 1.4, 3, 5, 10, 15, and 20 Mhz and provides a DL or UL service to a plurality of UEs. Different cells may be set to different bandwidths.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
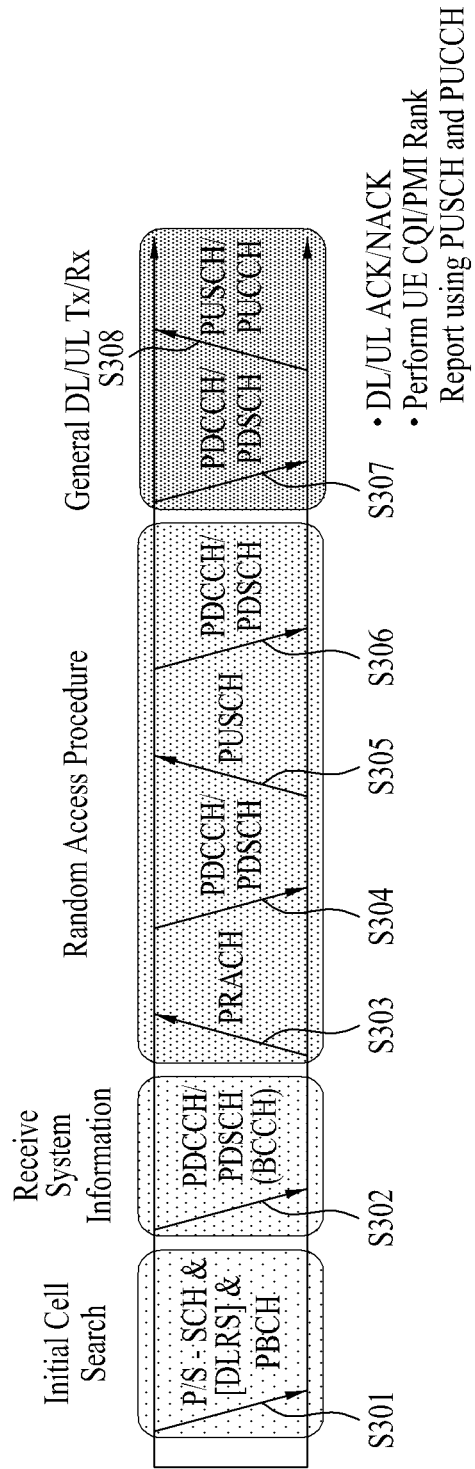
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Now a description will be given of a Multiple Input Multiple Output (MIMO) system. MIMO can increase the transmission and reception efficiency of data by using a plurality of Transmission (Tx) antennas and a plurality of Reception (Rx) antennas. That is, with the use of multiple antennas at a transmitter or a receiver, MIMO can increase capacity and improve performance in a wireless communication system. The term "MIMO" is interchangeable with 'multi-antenna'.

The MIMO technology does not depend on a single antenna path to receive a whole message. Rather, it completes the message by combining data fragments received through a plurality of antennas. MIMO can increase data rate within a cell area of a predetermined size or extend system coverage at a given data rate. In addition, MIMO can find its use in a wide range including mobile terminals, relays, etc. MIMO can overcome a limited transmission capacity encountered with the conventional single-antenna technology in mobile communication.

Figure 4:
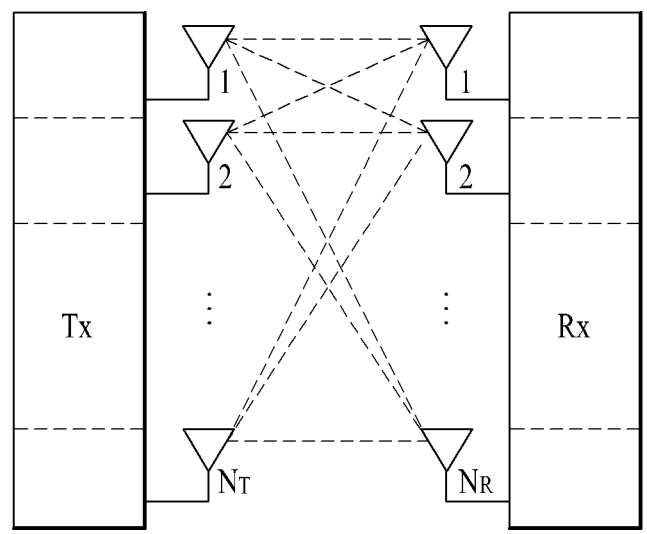
FIG. 4 illustrates a configuration of a Multiple Input Multiple Output (MIMO) communication system.

FIG. 4 illustrates the configuration of a typical MIMO communication system. Referring to FIG. 4, a transmitter has $N_T$ Tx antennas and a receiver has $N_R$ Rx antennas. The use of a plurality of antennas at both the transmitter and the receiver increases a theoretical channel transmission capacity, compared to the use of a plurality of antennas at only one of the transmitter and the receiver. The channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas. $R_i$ is the smaller value between $N_T$ and $N_R$.

$$R_i = \min(N_T, N_R) \qquad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards such as standards for 3G mobile communications, future-generation Wireless Local Area Network (WLAN), etc.

Concerning the research trend of MIMO up to now, active studies are underway in many aspects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with $N_T$ Tx antennas and $N_R$ Rx antennas as illustrated in FIG. 4 will be described in detail through mathematical modeling. Regarding a transmission signal, up to $N_T$ pieces of information can be transmitted through the $N_T$ Tx antennas, as expressed as the following vector.

$$s=[s_1, s_2, \ldots, s_{N_T}]^T \qquad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s}=[\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by [Equation 5]. Herein, $w_{ij}$ denotes a weight between a $j^{th}$ piece of information and an $i^{th}$ Tx antenna and W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \vdots \\ w_{i1} & w_{i2} & \ldots & w_{iN_T} \\ \vdots & & \ddots & \vdots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

In general, the rank of a channel matrix is the maximum number of different pieces of information that can be transmitted on a given channel, in its physical meaning. Therefore, the rank of a channel matrix is defined as the smaller between the number of independent rows and the number of independent columns in the channel matrix. The rank of the channel matrix is not larger than the number of rows or columns of the channel matrix. The rank of a channel matrix H, rank(H) satisfies the following constraint.

$$\text{rank}(H) \leq \min(N_T, N_R) \qquad \text{[Equation 6]}$$

A different piece of information transmitted in MIMO is referred to as 'transmission stream' or shortly 'stream'. The 'stream' may also be called 'layer'. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \qquad \text{[Equation 7]}$$

"# of streams" denotes the number of streams. One thing to be noted herein is that one stream may be transmitted through one or more antennas.

One or more streams may be mapped to a plurality of antennas in many ways. The stream-to-antenna mapping may be described as follows depending on MIMO schemes. If one stream is transmitted through a plurality of antennas, this may be regarded as spatial diversity. When a plurality of streams are transmitted through a plurality of antennas, this may be spatial multiplexing. Needless to say, a hybrid scheme of spatial diversity and spatial multiplexing in combination may be contemplated.

Figure 5:
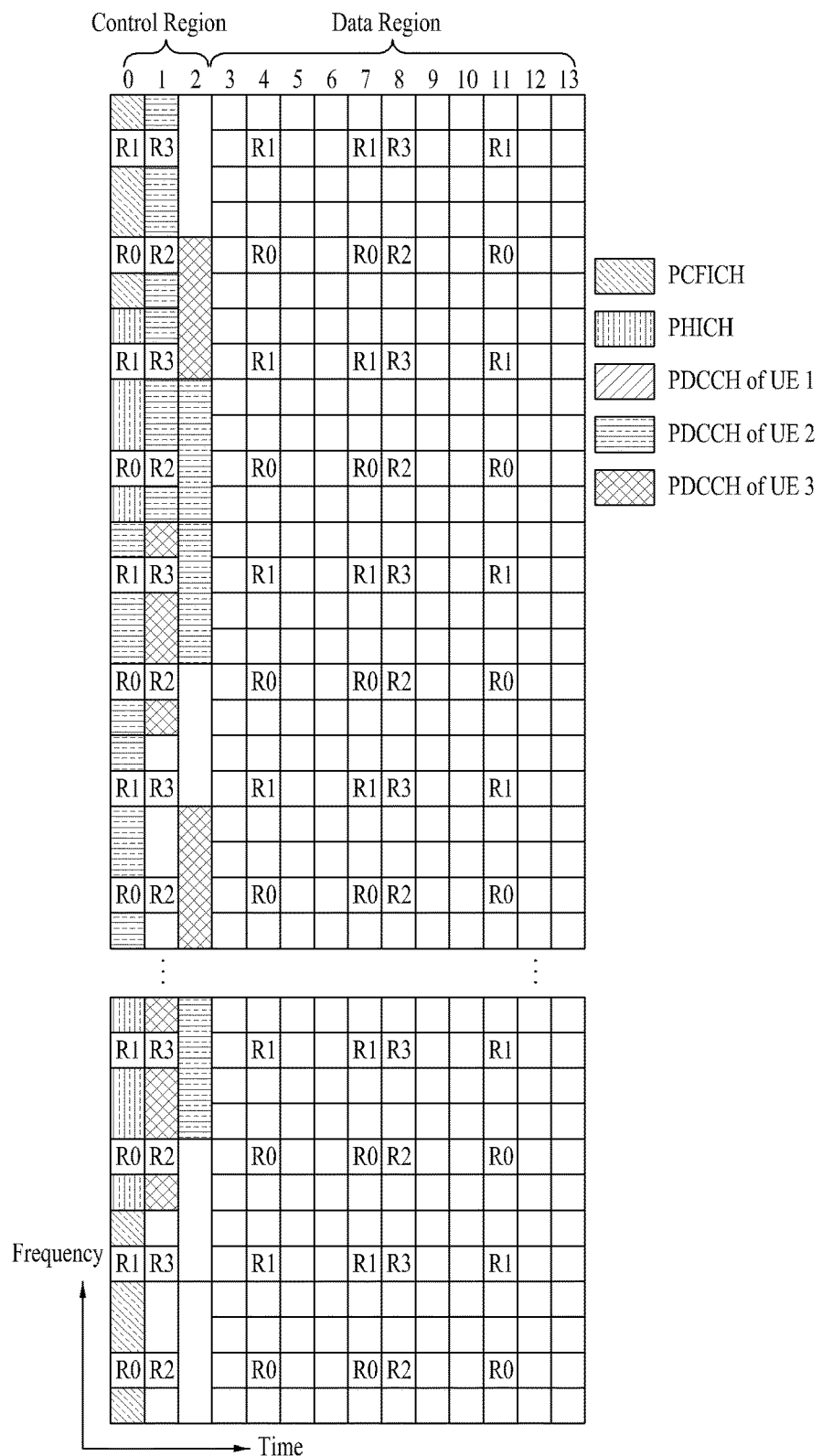
FIG. 5 illustrates a structure of a downlink radio frame in a Long Term Evolution (LTE) system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identifier (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

FIG. 6 illustrates REs used for configuring a DL control channel in the LTE system. Specifically, FIG. 6($a$) illustrates REs of a DL control channel in the case of 1 or 2 Tx antennas in an eNB and FIG. 6($b$) illustrates REs of a DL control channel in the case of 4 Tx antennas in an eNB. Although a different RS pattern is used according to the number of Tx antennas, REs are configured for a DL control channel in the same manner.

Referring to FIG. 6, a basic resource unit of a DL control channel is an REG. The REG includes four contiguous REs except for REs carrying RSs. REGs are marked with bold lines in FIG. 6. A PCFICH and a PHICH include 4 REGs and 3 REGs, respectively. A PDCCH is configured in units of a Control Channel Element (CCE), each CCE including 9 REGs.

To determine whether a PDCCH including L CCEs is transmitted to a UE, the UE is configured to monitor $M^{(L)}$ ($\geq L$) CCEs that are arranged contiguously or in a predetermined rule. L that the UE should consider for PDCCH reception may be a plural value. CCE sets that the UE should monitor to receive a PDCCH are referred to as a search space. For example, the LTE system defines search spaces as illustrated in [Table 1].

TABLE 1

| Search space $S_k^{(L)}$ | | Number of PDCCH candidates $M^{(L)}$ | |
|---|---|---|---|
| Type | Aggregation level L | Size [in CCEs] | DCI formats |
| UE-specific | 1 | 6 | 6 | 0, 1, 1A, 2B, |
| | 2 | 12 | 6 | 1D, 2, 2A, 2B, 4 |
| | 4 | 8 | 2 | |
| | 8 | 16 | 2 | |
| Common | 4 | 16 | 4 | 0, 1A, 1C, |
| | 8 | 16 | 2 | 3/3A |

In [Table 1], L is a CCE aggregation level, that is, the number of CCEs in a PDCCH, $S_k^{(L)}$ is a search space with CCE aggregation level L, and $M^{(L)}$ is the number of candidate PDCCHs to be monitored in the search space with CCE aggregation level L.

Search spaces are classified into a UE-specific search space accessible only to a specific UE and a common search space accessible to all UEs within a cell. A UE monitors common search spaces with CCE aggregation levels 4 and 8 and UE-specific search spaces with CCE aggregation levels 1, 2, 4, and 8. A common search space and a UE-specific search space may overlap with each other.

For each CCE aggregation level, the position of the first CCE (a CCE having the smallest index) of a PDCCH search space allocated to a UE changes in every subframe. This is called PDCCH search space hashing.

A CCE may be distributed across a system band. More specifically, a plurality of logically contiguous CCEs may be input to an interleaver and the interleaver may permute the sequence of the input CCEs on an REG basis. Accordingly, the time/frequency resources of one CCE are distributed physically across the total time/frequency area of the control region of a subframe. As a control channel is configured in units of a CCE but interleaved in units of an REG, a frequency diversity gain and an interference randomization gain may be maximized.

Figure 7:
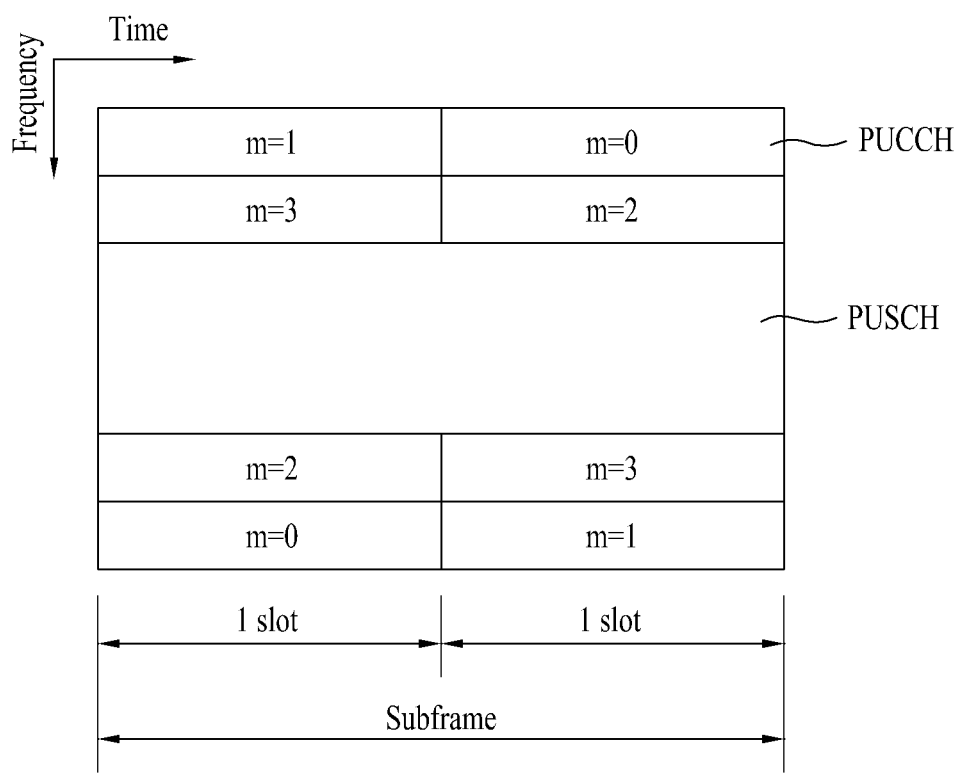
FIG. 7 illustrates a structure of an uplink radio frame in the LTE system.

FIG. 7 illustrates a structure of a UL subframe in the LTE system.

Referring to FIG. 7, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 6.

Due to emergence and proliferation of various devices requiring Machine-to-Machine (M2M) communication and a large amount of data, the amount of required data over a cellular network is increasing very fast in a current wireless communication environment. To satisfy the high data amount requirement, communication technology is being developed to carrier aggregation that enables efficient use of more frequency bands, MIMO that increases a data capacity in a limited frequency, Coordinated Multi-Point (CoMP), etc. Furthermore, the communication environment is evolving toward highly populated nodes accessible to users. A system having highly populated nodes may increase system performance through cooperation between nodes. This technology has very excellent performance, relative to a non-cooperative case where each node serves as an independent Base Station (BS), Advanced BS (ABS), Node B, eNB, Access Point (AP), or the like.

Figure 8:
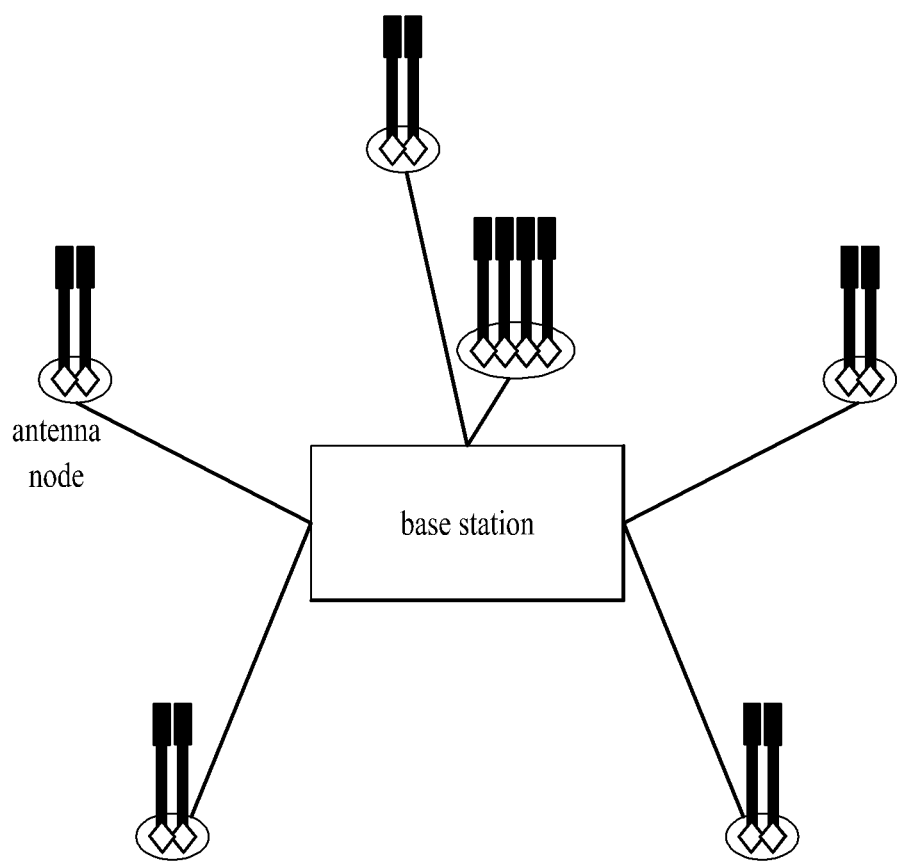
FIG. 8 illustrates a configuration of a multi-node system as a future-generation communication system.

FIG. 8 illustrates a configuration of a multi-node system as a future-generation communication system.

Referring to FIG. 8, if all nodes collectively operate as an antenna set of a cell, with their transmission and reception under control of a controller, this system may be regarded as a Distributed Multi-Node System (DMNS) forming one cell. The individual nodes may be allocated node IDs or may operate as antennas of the cell without node IDs. However, if the nodes have different cell IDs, this system may be regarded as a multi-cellular system. If multiple cells are overlaid according to their coverage, this is called a multi-tier network.

Meanwhile, a node may be any of a Node B, an eNB, a Picocell eNB (PeNB), a Home eNB (HeNB), a Remote Radio Head (RRH), a relay, a distributed antenna, etc. At least one antenna is installed in one node. A node is also called a transmission point. While a node refers to an antenna group with antennas apart from each other by a predetermined distance or farther, the present invention may be implemented even though a node is defined as an antenna group irrespective of the distance between antennas.

Owing to the introduction of the afore-described multi-node system and relay nodes, various communication techniques have become available, thereby improving channel quality. However, to apply MIMO and inter-cell cooperative communication technology to a multi-node environment, a new control channel is required. In this context, Enhanced PDCCH (E-PDCCH) is under discussion and it is regulated that the E-PDCCH is allocated to a data region (hereinafter, referred to as a PDSCH region) other than a legacy control region (hereinafter, referred to as a PDCCH region). Since the E-PDCCH enables transmission of control information about a node to each UE, shortage of the legacy PDCCH region may be overcome. The E-PDCCH may be accessible only to LTE-A UEs, not to legacy UEs.

Figure 9:
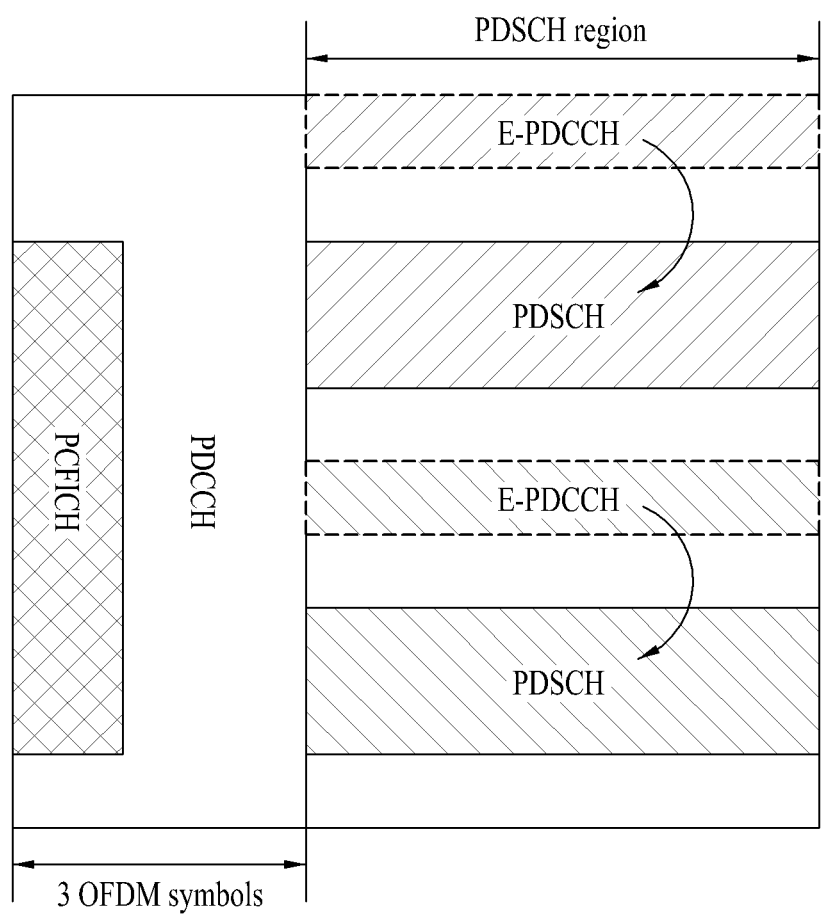
FIG. 9 illustrates an example of an Enhanced Physical Downlink Control Channel (E-PDCCH) and a Physical Downlink Shared Channel (PDSCH) scheduled by the E-PDCCH.

FIG. 9 illustrates an example of an E-PDCCH and a PDSCH scheduled by the E-PDCCH.

Referring to FIG. 9, an E-PDCCH may occupy a part of a PDSCH region that typically carries data. A UE should perform blind decoding to determine the presence or absence of an E-PDCCH directed to the UE. The E-PDCCH functions to schedule (i.e. PDSCH and PUSCH control) like a legacy PDCCH. However, if more UEs are connected to nodes such as RRHs and thus more E-PDCCHs are allocated to the PDSCH region, the UE should perform more blind decodings, thus experiencing increased complexity.

The present invention proposes a method for effectively mapping resources to an E-PDCCH that is a control channel transmitted in a legacy data region, instead of a legacy PDCCH.

Embodiment 1

If an E-PDCCH is modulated in a modulation scheme having a high modulation order such as 16-ary Quadrature Amplitude Modulation (16QAM) or transmitted in multiple layers, the E-PDCCH may be transmitted more effectively. In general, a control channel is modulated in a modulation scheme having a low modulation order such as Quadrature Phase Shift Keying (QPSK), for reception stability, and limited to one transmission layer, for reduction of interference in spatial resources. However, if a UE is placed in a very good channel state, it is preferable to increase the transmission rate of a control channel by means of a high modulation order or multi-layer transmission. If a control channel E-PDCCH is modulated with a high modulation order or transmitted in multiple layers, it is preferred that a data channel PDSCH is also modulated with a high modulation order or transmitted in multiple layers.

Accordingly, the present invention proposes that a data channel is modulated with a modulation order equal to or higher than a control channel and/or transmitted in as many layers as or more layers than the control channel, based on the above-described relationship between the control channel and the data channel.

According to the present invention, some field carrying information on the control channel is meaningless and the control channel is received effectively by utilizing the field. For example, the control channel typically includes a field indicating a Modulation and Coding Scheme (MCS) used for the data channel. When the control channel is modulated in 16QAM, the data channel is not modulated in QPSK in the present invention. Therefore, the number of bits in the MCS field may be reduced by excluding a value indicating QPSK and thus a coding rate may be increased in spite of the same number of REs. Or if a UE assumes non-use of QPSK although the number of bits in the MCS field is maintained, the probability of demodulation based on the MCS field indicating QPSK can be ignored. In this case, the probability of succeeding in demodulating the control channel can be increased.

If the control channel is transmitted using a modulation scheme having a high modulation order or multiple layers as described above, intended information may be transmitted with a smaller amount of resources. Therefore, the present invention proposes that a basic unit for E-PDCCH aggregation levels is configured with fewer REs for an E-PDCCH transmitted using a high-order modulation scheme or multiple layers than for an E-PDCCH transmitted using a low-order modulation scheme or a single layer.

For example, an E-PDCCH modulated in QPSK is transmitted, using one PRB as a basic aggregation unit (e.g., an Enhanced CCE (E-CCE)). That is, E-PDCCHs with aggregation levels 1, 2, 4, and 8 are transmitted in 1, 2, 4, and 8 PRBs, respectively.

On the other hand, for an E-PDCCH modulated in 16QAM, the REs of one PRB are divided into two subsets and a basic aggregation unit (e.g. E-CCE) is configured with one of the subsets. Herein, the subset is referred to as a sub-PRB. That is, E-PDCCHs with aggregation levels 1, 2, 4, and 8 are transmitted in 1, 2, 4, and 8 sub-PRBs, respectively. An E-PDCCH configured with two sub-PRBs may be transmitted in two sub-PRBs of the same PRB, that is, in one PRB, or in two sub-PRBs of two PRBs apart from each other in the frequency domain, each sub-PRB from one PRB to achieve a frequency diversity gain.

Or it may be contemplated that the size of an E-CCE is fixed, for example, to one sub-PRB and a plurality of E-CCEs are aggregated as a basic unit for configuring an E-PDCCH. In the above embodiment of the present invention, one E-CCE corresponding to one sub-PRB is considered as a basic unit for an E-PDCCH modulated in 16QAM, whereas two E-CCEs corresponding to two sub-PRBs is considered as a basic unit for an E-PDCCH modulated in QPSK.

Figure 10:
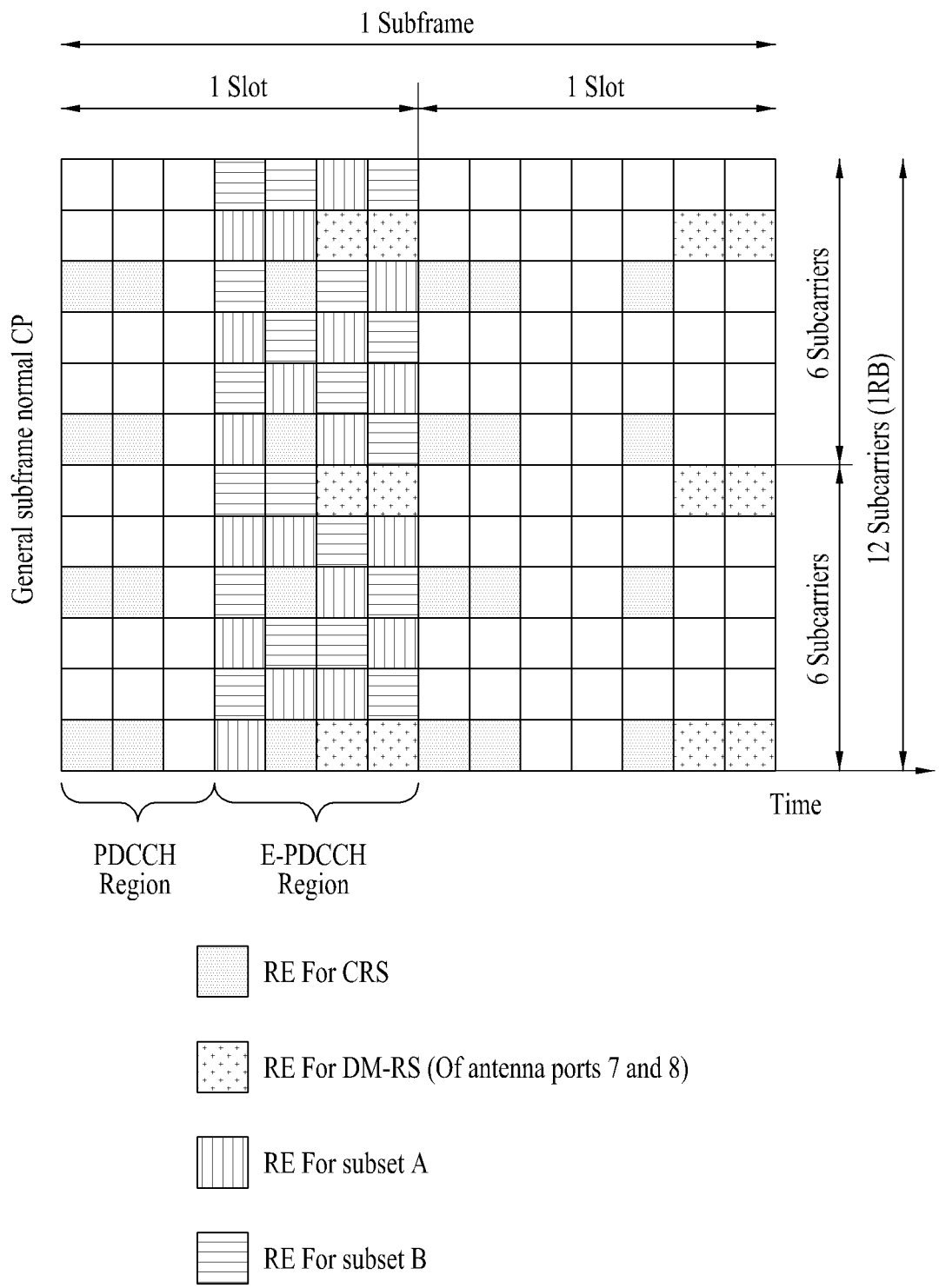
FIG. 10 illustrates an example of defining a basic unit for configuring an E-PDCCH as two sub-Physical Radio Resource Blocks (sub-PRBs) according to an embodiment of the present invention.

FIG. 10 illustrates an example of defining a basic unit for configuring an E-PDCCH as two sub-PRBs according to an embodiment of the present invention.

Referring to FIG. 10, a PRB in the first slot of a subframe is divided into two subsets, subset A and subset B and the two subsets, subset A and subset B are defined as a basic unit for an E-PDCCH. It is noted from FIG. 10 that subset A and subset B are mapped in a frequency-first manner.

FIG. 10 is purely exemplary. Thus, it is to be clearly understood that one PRB may be divided into two or more sub-PRBs in many other ways.

In another example of the present invention, it is possible to differentiate a modulation scheme or the number of transmission layers in one search space, for each aggregation level. For example, channel state may be good generally at a low aggregation level. Therefore, use of a high-order modulation scheme or multi-layer transmission may be preferable for the low aggregation level. On the contrary, a high aggregation level is used in a poor channel state or when a transmitter does not know an accurate channel state. Thus, a low-order modulation scheme or single-layer transmission is preferable for the high aggregation level, for a more stable operation.

For example, 16QAM may be used for aggregation level 1 and QPSK may be used for aggregation levels 2, 4, and 8. In another example, while an E-PDCCH with aggregation level 1 is transmitted in two layers, an E-PDCCH with aggregation level 2, 4, or 8 is transmitted in one layer.

In addition, a relationship between a basic aggregation unit (E-CCE) and the afore-described modulation scheme and number of transmission layers may be utilized. That is, resources are aggregated for an E-PDCCH using a small set of REs as a basic unit for an aggregation level using a high-order modulation or multi-layer transmission, whereas resources are aggregated for an E-PDCCH using a large set of REs as a basic unit for an aggregation level using a low-order modulation or single-layer transmission.

For example, an E-PDCCH is transmitted in units of a sub-PRB at aggregation level 1 using 16QAM, whereas an E-PDCCH is transmitted in units of a PRB at aggregation level 2, 4, or 8 using QPSK. With this operation, the number of bits in a single E-PDCCH may be maintained to be a multiple of a basic unit, K bits because n×K bits are transmitted at aggregation level n even though a modulation scheme or the number of transmission layers is changed (K is the number of bits of DL control information at aggregation level 1).

For example, if an E-PDCCH with aggregation level 1 is modulated in 16QAM and transmitted in one sub-PRB occupying a half of the REs of a PRB, the E-PDCCH delivers K bits in total. In the case of aggregation level 2, 4, or 8, an E-PDCCH is modulated in QPSK, thus decreasing the number of transmission bits per RE to a half. However, since 2, 4, or 8 PRBs are used at aggregation level 2, 4, or 8, the number of used REs is increased by 4, 8, or 16 times from at aggregation level 1. As a consequence, the E-PDCCH delivers 2K, 4K, or 8K bits. It is also possible to transmit an E-PDCCH with aggregation level 1 or 2 in units of a sub-PRB by use of 16QAM and an E-PDCCH with aggregation level 4 or 8 in units of a PRB by use of QPSK.

To implement the above-described operations, an eNB may indicate an aggregation level and a modulation scheme/the number of transmission layer/a basic aggregation unit (E-CCE) to be used at the aggregation level to a UE by high-layer signaling such as RRC signaling.

In another method for reducing the number of REs in a basic aggregation unit for an E-PDCCH, the number of OFDM symbols used in transmitting the E-PDCCH may be reduced. For example, an E-PDCCH using QPSK is transmitted in one slot of a subframe (i.e. $4^{th}$ to $7^{th}$ OFDM symbols of the subframe) as illustrated in FIG. 10, whereas an E-PDCCH using 16QAM is transmitted in fewer OFDM symbols (e.g., $4^{th}$ and $5^{th}$ OFDM symbols). Since the number of symbols for an E-PDCCH is reduced, E-PDCCH transmission may be completed early, particularly in a high-order modulation scheme and more data may be transmitted in the following symbols.

Embodiment 2

Aside from the modulation order or the number of transmission layers of an E-PDCCH, the size of a basic aggregation unit for the E-PDCCH may be adjusted according to other communication configurations. For example, the size of the basic aggregation unit may be adjusted according to the position of the starting or ending symbol of the E-PDCCH, which may define the amount of resources available to the E-PDCCH.

First of all, a system bandwidth may be considered. The E-PDCCH carries information about frequency resources occupied by scheduled data in a frequency area configured by a current cell. In general, the number of bits in the frequency resource information is proportional to the system bandwidth. If the system bandwidth is narrow, the number of bits transmitted in the E-PDCCH is also decreased. When the number of bits in the E-PDCCH is decreased to or below a predetermined value, reduction of the size of the basic aggregation level for the E-PDCCH or reduction of the number of symbols used for transmission of the E-PDCCH may be more effective in resource utilization.

Second, the number of CRS antenna ports or a PDCCH length may be considered. An eNB should transmit a CRS and a PDCCH at least in some first symbols of a subframe to support legacy UEs that measure channels and receive a control signal using the CRS and the PDCCH. If the eNB does not transmit a CRS or a PDCCH in a specific subframe (or transmits a CRS or a PDCCH in a limited number of symbols, for example, in one symbol), E-PDCCH transmission may be completed early in the subframe. Therefore, it is more effective to use the following symbols in data transmission.

Now, a description will be given of a method for adjusting a basic aggregation unit for an E-PDCCH, for example, according to a PDCCH length (or the index of the starting symbol of the E-PDCCH). The E-PDCCH is transmitted preferably after PDCCH transmission. The number of symbols occupied by a PDCCH may vary with a subframe configuration and as a result, the starting symbol of the E-PDCCH may also be changed according to the subframe configuration.

If the E-PDCCH starts early (for example, in symbol #0 or symbol #1), relatively many REs of a single PRB may be used for transmission of the E-PDCCH. Accordingly, the basic E-PDCCH aggregation unit is preferably set to a sub-PRB smaller than a PRB. On the contrary, if the E-PDCCH start later (for example, in symbol #2 or symbol #3), a relatively small number of REs in a single PRB are available. Then, there is no need for necessarily aggregating resources for the E-PDCCH on a sub-PRB basis. Rather, the aggregation is preferably performed on a PRB basis.

FIG. 11 illustrates an example of defining a basic aggregation unit for an E-PDCCH according to another embodiment of the present invention. Particularly, a basic aggregation unit is changed according to the starting symbol of an E-PDCCH on the assumption of aggregation level 2 in FIG. 11.

Referring to FIG. 11, (a) indicates a case where when an E-PDCCH starts late (for example, in symbol #2 or symbol #3), PRB-wise aggregation is performed for the E-PDCCH. (b) indicates a case where when an E-PDCCH starts early (for example, in symbol #0 or symbol #2), relatively many REs of a single PRB are available for E-PDCCH transmission and thus a basic aggregation unit is set to a sub-PRB smaller than a PRB for the E-PDCCH.

While the sub-PRB-wise aggregation scheme and the PRB-wise aggregation scheme have been described above, the present invention is not limited thereto. Rather, the present invention covers a more generalized situation as described below. That is, sub-PRB type n is defined by dividing one PRB into n subsets and n is changed according to the starting symbol of E-PDCCH transmission. Therefore, if an E-PDCCH starts early, a larger n value is used because more REs of a single PRB are available to the E-PDCCH (i.e. a single PRB is divided into more sub-PRBs and the resulting sub-PRB type is used as a basic aggregation unit). In contrast, if an E-PDCCH starts large, a smaller n value is used (i.e. a single PRB is divided into fewer sub-PRBs and the resulting sub-PRB type is used as a basic aggregation unit).

If a UE is aware that an E-PDCCH starts early, the UE monitors a search space using a larger n value than during blind decoding of an E-PDCCH (i.e., using a basic aggregation unit acquired by dividing a single PRB into more sub-PRBs). On the contrary, if the UE is aware that an E-PDCCH starts late, the UE monitors a search space using a smaller n value (i.e., using a basic aggregation unit acquired by dividing a single PRB into fewer sub-PRBs).

Further, n may be changed according to the ending symbol of an E-PDCCH. When the E-PDCCH ends relatively late, a larger n value may be used (i.e., a basic aggregation unit acquired by dividing a single PRB into more sub-PRBs may be used) because more REs of a single PRB are available to the E-PDCCH. On the other hand, when the E-PDCCH ends relatively early, a smaller n value may be used (i.e., a basic aggregation unit acquired by dividing a single PRB into fewer sub-PRBs may be used).

Likewise, if a UE is aware that an E-PDCCH ends relatively late, the UE monitors a search space using a larger n value (i.e., using a basic aggregation unit acquired by dividing a single PRB into more sub-PRBs), whereas if the UE is aware that an E-PDCCH ends relatively early, the UE monitors a search space using a smaller n value (i.e., using a basic aggregation unit acquired by dividing a single PRB into fewer sub-PRBs).

Embodiment 3

Without associating information such as the number of REs in a basic aggregation unit for an E-PDCCH or the position of the starting/ending symbol of the E-PDCCH with the above-described E-PDCCH modulation scheme or system bandwidth, an eNB may freely set the information and signal the information in a specific message by high-layer signaling such as RRC signaling. The starting/ending time of the E-PDCCH may be different in each subframe.

For example, since a legacy UE searches for its PDCCH, assuming that the PDCCH is always transmitted in two symbols in an MBSFN subframe of a cell for which 4-antenna port CRSs are configured, it may be impossible to use the first or second symbol of the subframe for E-PDCCH transmission. Accordingly, a third embodiment of the present invention proposes that the position of the starting/ending symbol of an E-PDCCH is set to be different in each subframe. One thing important is that the position of the starting/ending symbol of an E-PDCCH is different irrespective of transmission or non-transmission of a PDCCH.

More specifically, an eNB transmits a subframe pattern and indicates use of a specific starting/ending point of an E-PDCCH in subframes indicated by the subframe pattern. Then the eNB transmits another subframe pattern and indicates use of a specific starting/ending point of an E-PDCCH in other subframes indicated by the subframe pattern. Without signaling the subframe patterns, subframes may simply be divided into an MBSFN subframe and a non-MBSFN subframe (i.e. a general subframe). In this case, it is possible to indicate the position of the starting/ending point of an E-PDCCH for each of the MBSFN subframe and the non-MBSFN subframe. Once the starting OFDM symbol of an E-PDCCH is determined in the above-described method, a PDSCH scheduled by the E-PDCCH preferably starts in the same OFDM symbol.

Figure 12:
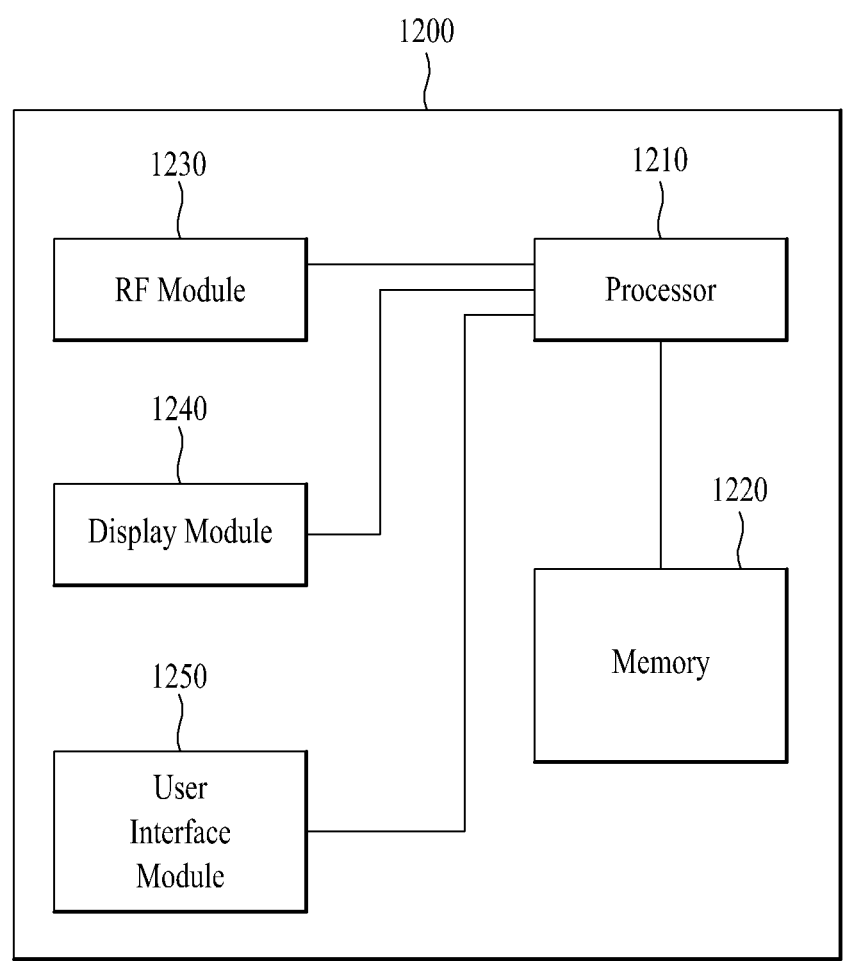
FIG. 12 is a block diagram of a communication apparatus according to an embodiment of the present invention.

FIG. 12 is a block diagram of a communication apparatus according to an embodiment of the present invention.

Referring to FIG. 12, a communication apparatus 1200 includes a processor 1210, a memory 1220, a Radio Frequency (RF) module 1230, a display module 1240, and a User Interface (UI) module 1250.

The communication device 1200 is shown as having the configuration illustrated in FIG. 12, for the convenience of description. Some modules may be added to or omitted from the communication apparatus 1200. In addition, a module of the communication apparatus 1200 may be divided into more modules. The processor 1210 is configured to perform operations according to the embodiments of the present invention described before with reference to the drawings. Specifically, for detailed operations of the processor 1210, the descriptions of FIGS. 1 to 11 may be referred to.

The memory 1220 is connected to the processor 1210 and stores an Operating System (OS), applications, program codes, data, etc. The RF module 1230, which is connected to the processor 1210, upconverts a baseband signal to an RF signal or downconverts an RF signal to a baseband signal. For this purpose, the RF module 1230 performs digital-to-analog conversion, amplification, filtering, and frequency upconversion or performs these processes reversely. The display module 1240 is connected to the processor 1210 and displays various types of information. The display module 1240 may be configured as, not limited to, a known component such as a Liquid Crystal Display (LCD), a Light Emitting Diode (LED) display, and an Organic Light Emitting Diode (OLED) display. The UI module 1250 is connected to the processor 1210 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the method and apparatus for transmitting a downlink control channel at a BS in a wireless communication system have been described mainly in the context of a 3GPP LTE system, they are applicable to many other wireless communication systems.

What is claimed is:

1. A method for receiving a downlink control channel from a base station (BS) at a user equipment (UE) in a wireless communication system, the method comprising;
   determining a minimum number of resource units for aggregation by comparing a downlink bandwidth with a threshold value related to the downlink bandwidth; and
   receiving, from the BS, the downlink control channel using an aggregation of one or more of the determined minimum number of resource units,
   wherein, when the downlink bandwidth is equal to or larger than the threshold value, the minimum number of the resource units is determined to be 2,
   wherein, when the downlink bandwidth is smaller than the threshold value, the minimum number of the resource units is determined to be 1.

2. The method of claim 1, wherein the downlink control channel is an enhanced physical downlink control channel (EPDCCH) and the resource unit is an enhanced control channel element (ECCE).

3. A user equipment (UE) in a wireless communication system, the UE comprising:
   a Radio Frequency (RF) unit;
   a processor connected with the RF unit and configured to
      determine a minimum number of resource units for aggregation by comparing a downlink bandwidth with a threshold value related to the downlink bandwidth; and
      receive, from a base station (BS), a downlink control channel using an aggregation of one or more of the determined minimum number of resource units,
   wherein, when the downlink bandwidth is equal to or larger than the threshold value, the minimum number of the resource units is determined to be 2,
   wherein, when the downlink bandwidth is smaller than the threshold value, the minimum number of the resource units is determined to be 1.

4. The UE of claim 3, wherein the downlink control channel is an enhanced physical downlink control channel (EPDCCH) and the resource unit is an enhanced control channel element (ECCE).

5. A method for transmitting a downlink control channel to a user equipment (UE) at a base station (BS) in a wireless communication system, the method comprising;
   determining a minimum number of resource units for aggregation by comparing a downlink bandwidth with a threshold value related to the downlink bandwidth; and
   transmitting the downlink control channel using an aggregation of one or more of the determined minimum number of resource units to the UE,
   wherein, when the downlink bandwidth is equal to or larger than the threshold value, the minimum number of the resource units is determined to be 2,
   wherein, when the downlink bandwidth is smaller than the threshold value, the minimum number of the resource units is determined to be 1.

6. The method of claim 5, wherein the downlink control channel is an enhanced physical downlink control channel (EPDCCH) and the resource unit is an enhanced control channel element (ECCE).

7. A base station (BS) in a wireless communication system, the BS comprising:
   a Radio Frequency (RF) unit;
   a processor connected with the RF unit and configured to:
      determine a minimum number of resource units for aggregation by comparing a downlink bandwidth with a threshold value related to the downlink bandwidth;
      transmit a downlink control channel using an aggregation of one or more of the determined minimum number of resource units from a user equipment (UE),
   wherein, when the downlink bandwidth is equal to or larger than the threshold value, the minimum number of the resource units is determined to be 2,
   wherein, when the downlink bandwidth is smaller than the threshold value, the minimum number of the resource units is determined to be 1.

8. The BS of claim 7, wherein the downlink control channel is an enhanced physical downlink control channel (EPDCCH) and the resource unit is an enhanced control channel element (ECCE).

* * * * *